3,634,363
POLYMER OF 4-CARBOXY-2-PIPERIDONE

George J. Schmitt, Madison, and Karl P. Klein and Herbert K. Reimschuessel, Morristown, N.J., assignors to Allied Chemical Corporation, New York, N.Y.
No Drawing. Filed Feb. 26, 1969, Ser. No. 802,673
Int. Cl. C08g 20/10
U.S. Cl. 260—78 P                                   5 Claims

ABSTRACT OF THE DISCLOSURE 4-carboxy-2-piperidone polymerizes readily on heating above its melting point to afford a polymer consisting essentially of recurring units of the structure:

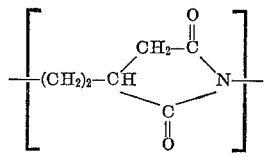

This polymer forms transparent films, filaments, and coatings of high strength and glass transition temperature.

CROSS-REFERENCES TO RELATED APPLICATIONS 4-carboxy-2-piperidone and a process for the preparation thereof are claimed in our copending, commonly assigned, application Ser. No. 802,630, entitled "Process for the Preparation of 4-Carboxy-2-Piperidone and Esters Thereof," filed on instant date herewith.

BACKGROUND OF THE INVENTION

Thermoplastics such as nylon 6 have achieved very widespread usage. However, it is indisputable that no thermoplastic currently available has ideal properties for all uses. One or more shortcomings are always present. There is, therefore, always a need for a new thermoplastic that can be readily prepared from cheap and easily obtainable monomers.

It is an object of this invention to provide a novel high molecular weight thermoplastic polymer that can be readily formed by conventional thermoplastic polymer-forming procedures into transparent films, filaments and coatings of high strength and glass transition temperature.

It is a further object of this invention to provide a novel thermoplastic polymer that is easily prepared from inexpensive, simple-to-make starting materials.

Further objects and advantages will become apparent from the description of the invention which follows in greater detail.

The polymers of the instant invention are prepared from 4-carboxy-2-piperidone:

(I)

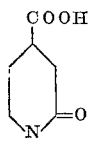

a substituted six-membered lactam.

The polymers consist essentially of recurring units of the structure:

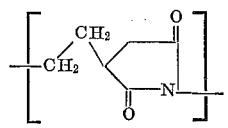

that is, a poly(2,5-dioxo-1,3-pyrrolidinediyl)dimethylene.

The preparation of polymers from lactams is known. The seven-membered ring, i.e., E-caprolactam, is, of course, the starting material for nylon 6; however, polymerization of the corresponding five- and six-membered lactam rings, i.e., α-pyrrolidone and α-piperidone, is not widely practiced.

Polymerization of α-pyrrolidone in the presence of basic catalysts to form the linear polymer, poly-4-butyramide, is reported in U.S. Pats. Nos. 2,638,463; 2,734,043 and 2,739,959.

Polymerization of α-piperidone was at first believed to be impossible—J. Am. Chem. Soc., 52, 5289 (1930), ibid 80, 6406 (1958); Trans. Faraday Soc., 51, 1717 (1955). More recently, the catalytic polymerization of α-piperidone has been reported—U.S. Pat. No. 2,806,841, J. Pol. Sci., 43, 117 (1960).

It has been shown that the application of heat alone does not effect polymerization of previously known lactams. The conversion of such lactams to linear polyamides is accomplished by catalytic processes that may be either hydrolytic or nonhydrolytic. Generally, lactams with six or more carbon atoms may be polymerized by either type process, whereas only a nonhydrolytic process is suitable for the polymerization of lactams with less than six carbon atoms. In the latter cases, water was found to have a very serious inhibitory effect on the polymerization.

An article [Markromol Chemic., 80, 44 (1964)] reports that mono-substituted-α-piperidones are unpolymerizable by any method.

It has now been found in accordance with the instant invention that the polymerization of compound (I) can be effected by heat alone and in the absence of any additional catalyst.

The process is carried out in the absence of oxygen. The exclusion of oxygen can be achieved by evacuation of the polymerization vessel or by maintaining an atmosphere of an inert gas such as nitrogen, helium, argon, or carbon dioxide in said vessel. The latter method of excluding oxygen is generally preferable from a convenience standpoint.

Although the polymerization of 4-carboxy-2-piperidone can be achieved by heat alone, no deleterious effects are observed when the polymerization is conducted in the presence of small amount of water.

In effecting polymerization, compound (I) can be heated either neat or dispersed in a refluxing, high-boiling, inert liquid menstruum. The term dispersed as used herein connotes that compound (I) can be either fully dissolved in said liquid menstruum and suspended therein in finely particulate form or partially dissolved and partially suspended therein. Suitable liquids include o-dichlorobenzene, trichlorobenzene, Tetralin, Decalin, mineral oil, and silicone oil.

Since the polymerization results in the production of 1 mol of water per mol of compound (I), polymerization is preferably effected in a refluxing solvent such as di- or trichlorobenzene, Tetralin or Decalin in a polymerization vessel equipped with an apparatus such as Dean Starke trap which enables the water produced in the polymerization to be entrained off by the refluxing solvent.

The heating temperature necessary to effect polymerization can vary from at least 150° C. up to about 250° C. Temperatures above 250° C., although not in any way inoperable, serve no useful purpose and may cause a small amount of thermal degradation of the polymer. The preferred polymerization temperature is about 180° to 220° C.

The duration of heating to effect polymerization will vary with the temperature and degree of polymerization (DP) desired. In general, the higher the temperature, the more rapid the polymerization, and the longer the heating, the greater the DP achieved. Noticeable thickening is achieved by heating compound (I) at 150° C. for 1 hour. High molecular weight polymer is obtained by heating for up to about 24 hours. Still longer heating does not cause any significant further increase in molecular weight— although it is not harmful. The polymer, after formation, can be poured out of the polymerization vessel in molten form, if polymerization has been effected without a dispersing liquid. If a dispersing liquid is used, the polymer can be separated therefrom by decantation or filtration, for example.

The polymer is soluble in formic acid, meta-cresol, trifluoroethanol, and sulfuric acid. It is an amorphous thermoplastic that can be readily formed into virtually any desired shape, including films and filaments, by conventional processing methods such as extrusion; blow, compression or injection molding; or melt or solution casting.

The 4-carboxy-2-piperidone monomeric starting material and the process for the preparation thereof is disclosed and claimed in our copending, commonly assigned, application Ser. No. 802,630, entitled "Process for the Preparation of 4 - Carboxy - 2 - Piperidone and Esters Thereof," filed on instant date herewith, the pertinent portions of which are hereby incorporated by reference. In essence, we have found that 4-alkoxycarbonyl-2-piperidones can be prepared in only two steps, both of which afford high yields, from dialkyl esters of itaconic acid.

The two-step reaction can be represented as follows:

$$CH_2=C-COOR \atop H_2C-COOR \quad \xrightarrow{HCN}$$

(III)

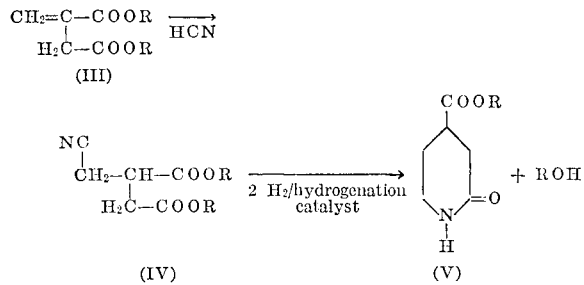

(IV) (V)

wherein R in compounds (III), (IV) and (V) represents an alkyl group of 1–10 carbon atoms. The free acid, 4-carboxy-2-piperidone:

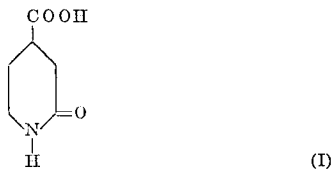

(I)

can be prepared from the ester (V) by conventional ester saponification with base followed by acidification. This compound is unknown to the prior art.

The instant invention can be more fully understood by reference to the following examples. All parts are parts by weight unless otherwise expressly noted.

EXAMPLE 1

Five parts of 4-carboxy-2-piperidone and 0.2 part of water were placed in a Pyrex polymerization tube fitted with a gas inlet tube. The Pyrex tube was swept with nitrogen and then immersed in an oil bath maintained at a constant temperature of 220° C. After 24 hours, the polymerization tube was removed from the bath and allowed to cool to room temperature while maintaining a continuous nitrogen sweep. After cooling, the tube was broken away from the polymer plug, which was ground. After extraction in boiling ethanol with subsequent drying at 100° C. and 30 mm. Hg, the ground polymer sample exhibited a reduced viscosity of 0.8, when measured using an 0.13-gram sample in 25 cc. of meta-cresol solution at 25° C.

The spectral data of the polymer samples were consistent with the polyimide structure: Infrared analysis film showed a strong absorption peak at 1700–1740 cm.$^{-1}$ (imide C=O); nuclear magnetic resonance (NMR) analysis (15% polymer in formic acid) showed peaks at 1.17–2.13 (complex multiplet, NCH$_2$CH$_2$CH); 2.44 (multiplet, COCH$_2$) and 3.26 (multiplet, NCH$_2$).

EXAMPLE 2

Two samples of 4-carboxy-2-piperidone were heated to 200° C. and 220° C., respectively, in a nitrogen sweep for 20 hours and then maintained at this temperature an additional 20 hours under vacuum (2 mm. Hg). The polymer samples, when worked up as in Example 1, had reduced viscosity values of 1.0 and 1.4, respectively, when measured using an 0.13-gram sample in 25 cc. of meta-cresol at 25° C. The infrared spectra of these samples were identical to that of polymer from Example 1.

EXAMPLE 3

One hundred grams of particulate 4-carboxy-2-piperidone was dispersed in 2000 cc. of refluxing dichlorobenzene for 48 hours. Nitrogen was bubbled through the dispersion during this period. The water formed during the polymerization was removed by passing the dichlorobenzene reflux vapors through a Soxhlet apparatus containing anhydrous magnesium sulfate. After cooling the reaction mixture to room temperature, dichlorobenzene was decanted and the polymeric precipitate dissolved in formic acid. The resulting solution was filtered and the filtrate added dropwise to ether. The polymer which precipitated was washed with ethanol at room temperature and then extracted with boiling ethanol. After drying at 100° C. and 30 mm. Hg, the reduced viscosity of the polymer was 0.5, when measured using an 0.13-gram sample in 25 cc. of meta-cresol at 25° C.

The polymer was pressure molded at 235° C. into films which were tested on an "Instron" testing apparatus, the tensile values are listed in Table I.

TABLE I.—TENSILE VALUES

| Sample | Ultimate elongation (U.E.) (percent) | Ultimate tensile strength (U.T.S.) (p.s.i.) | 2% Secant modulus (p.s.i.) | Tear strength (lb./in.) |
|---|---|---|---|---|
| Atmosphere bone dry (23° C.) | 2.6 | 12,480 | 528,850 | 1,440 |
| 50% Relative humidity (23° C.) | 2.9 | 11,610 | 489,560 | 1,530 |

EXAMPLE 4

Fifty grams of 4-carboxy-2-piperidone was polymerized in refluxing trichlorobenzene and worked up, as described for the polymerization of Example 3. The resulting polymer had a reduced viscosity of 1.5 when measured using an 0.13-gram sample in 25 cc., of meta-cresol at 25° C. Differential thermal analysis measurements indicated that the polymer had a glass transition temperature of 127° C. when heated at a rate of 20° C./minute. When heated to 250° C., quenched and re-heated at 20° C./minute, the glass transition temperature of the polymer sample was 135° C. Thermal gravimetric analysis measurements showed that the polymer experienced a 1% weight loss in either air or N$_2$ at 300° C. when heated at a rate of 10° C./minute. Table II gives results of the testing of films pressure molded from the polymer at 250°–280° C.

TABLE II.—TENSILE VALUES

| Sample | U.E. (percent) | U.T.S. (p.s.i.) | 2% secant modulus (p.s.i.) |
|---|---|---|---|
| Atmosphere bone dry (23° C.) | 5.5 | 14,220 | 479,270 |
| 50% relative humidity (23° C.) | 5.7 | 12,480 | 477,570 |

EXAMPLE 5

Dimethyl cyanomethyl succinate

To a stirred solution of 79.0 grams (0.5 mol) of distilled dimethyl itaconate in 400 ml. of methanol cooled to 2° C. was added dropwise 65.1 grams (1 mol) of potassium cyanide in 400 ml. of water. After ½ hour, 65 ml. (0.75 mol) of cold concentrated hydrochloric acid was added. The reaction mixture was stirred at room temperature for 72 hours and then extracted with three portions of ether. The ethereal extracts were combined, dried over MgSO₄, filtered, and solvent evaporated. The resulting oil was distilled at reduced pressure to afford 71.4 grams (77%) of dimethyl cyanomethyl succinate, boiling point 1132–117° C. at 0.8 mm. Hg.

Infrared analysis (neat) showed strong absorption bands at 2260 cm.$^{-1}$ (C≡N) 1745 cm.$^{-1}$ (C=O).

*Elemental analysis.*—Calculated for C₈H₁₁NO₄.—Theory (percent): C, 51.88; H, 5.99; N, 7.57. Found (percent): C, 51.58; H, 5.76; N, 7.76.

EXAMPLE 6

4-methoxycarbonyl-2-piperidone

A solution of dimethyl cyanomethyl succinate (46.3 g.) (0.25 mol) in 250 cc. methanol was hydrogenated at 400 p.s.i. and 100° C. for 5 hours using a Raney nickel catalyst (4 grams). Following hydrogenation, the solution was filtered to remove the catalyst and the methanol evaporated at reduced pressure. The resulting solid residue was recrystallized from petroleum ether/methylene chloride to give 33.8 g. (86%) of 4-methoxycarbonyl-2-piperidone, melting point 126.5°–127° C. Infrared analysis (KBr pellet) showed strong absorption bands at 1740 cm.$^{-1}$ (ester C=O), 1665 cm.$^{-1}$ (lactam C=O).

*Elemental analysis.*—Calculated for C₇H₁₁NO₃.—Theory (percent): C, 53.49; H, 7.06; N, 8.91. Found (percent): C, 53.33; H, 7.14; N, 8.92.

EXAMPLE 7

4-carboxy-2-piperidone

To a stirred solution of 12.3 g. (0.22 mol) of potassium hydroxide in 150 ml. of methanol was added 31.4 g. (0.2 mol) of 4-methoxycarbonyl-2-piperidone in 150 ml. of methanol. The solution was refluxed for 6 hr. and allowed to stir at room temperature for 16 hr. The solvent was then removed at reduced pressure. The resulting solid was dissolved in 50 ml. of water, cooled to about 0° C., and acidified with concentrated hydrochloric acid. Three recrystallizations of the precipitate from ethanol/water yielded 25.5 g. (89%) of 4-carboxy-2-piperidone, melting point 174.5°–175.5° C. Infrared analysis (KBr pellet) showed strong absorption bands at 1695 cm.$^{-1}$ (acid C=O) and 1635 cm.$^{-1}$ (lactam C=O).

*Elemental analysis.*—Calculated for C₆H₉NO₃.—Theory (percent): C, 50.34; H, 6.34; N, 9.79. Found (percent):C, 50.36; H, 6.36; N, 9.60.

Various modifications will be apparent to one skiled in the art, and it is not intended that this invention be limited to the details in the specific examples presented by way of illustration. Accordingly, the scope of the invention is limited only by the appended claims.

We claim:
1. A thermoplastic polymer consisting essentially of recurring units of the structure:

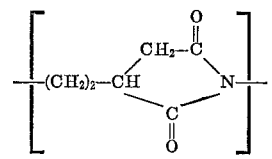

2. A process for producing the polymer of claim 1 consisting of heating 4-carboxy-2-piperidone under oxygen-free conditions at a temperature of at least about 150° C. for a time sufficient to effect polymerization thereof.

3. A process in accordance with claim 2 wherein said temperature ranges from about 180° to about 220° C.

4. A process in accordance with claim 2 wherein said 4-carboxy-2-piperidone is dispersed in a high-boiling, inert liquid menstruum.

5. A process in accordance with claim 4 wherein said liquid is selected from the group consisting of o-dichlorobenzene, trichlorobenzene, Tetralin and Decalin and wherein said liquid is heated to reflux.

References Cited

UNITED STATES PATENTS

| | | | |
|---|---|---|---|
| 2,421,024 | 5/1947 | Frosch | 260—78 |
| 2,502,576 | 4/1950 | Lincoln et al. | 260—78 |
| 2,865,895 | 12/1958 | Pieper et al. | 260—78 |
| 3,022,274 | 2/1962 | Glickman et al. | 260—78 |
| 3,061,592 | 10/1962 | Schnell et al. | 260—78 |
| 3,158,589 | 11/1964 | Glickman et al. | 260—78 |
| 3,174,951 | 3/1965 | Taber | 260—78 |
| 3,384,625 | 5/1968 | Reimschuessel | 260—78 |
| 3,405,099 | 10/1968 | Taber | 260—78 |
| 3,422,093 | 1/1969 | Reimschuessel et al. | 260—78 |
| 3,448,086 | 6/1969 | Bachman et al. | 260—78 |
| 3,542,744 | 11/1970 | Reimscheussel et al. | 260—78 L |

HAROLD D. ANDERSON, Primary Examiner

U.S. Cl. X.R.

260—30.8 R, 31.2 N, 33.4 R